(12) United States Patent
Yudin et al.

(10) Patent No.: US 6,434,299 B1
(45) Date of Patent: Aug. 13, 2002

(54) WAVELENGTH DIVISION MULTIPLEXING/ DEMULTIPLEXING DEVICES HAVING CONCAVE DIFFRACTION GRATINGS

(75) Inventors: Yuri A. Yudin, Nashua, NH (US); Mikhail N. Sokolskiy, St. Petersburg (RU); Robert K. Wade, Boca Raton, FL (US)

(73) Assignee: LightChip, Inc., Salem, NH (US)

( * ) Notice: Subject to any disclaimer, the term of this patent is extended or adjusted under 35 U.S.C. 154(b) by 78 days.

(21) Appl. No.: 09/604,616

(22) Filed: Jun. 27, 2000

Related U.S. Application Data

(63) Continuation-in-part of application No. 09/323,094, filed on Jun. 1, 1999, now Pat. No. 6,263,135, and a continuation-in-part of application No. 09/382,492, filed on Aug. 25, 1999, and a continuation-in-part of application No. 09/363,041, filed on Jul. 29, 1999, now Pat. No. 6,243,513, and a continuation-in-part of application No. 09/392,670, filed on Sep. 8, 1999, now Pat. No. 6,298,182.

(51) Int. Cl.[7] .............................. G02B 6/34; H04J 14/00
(52) U.S. Cl. ............................. 385/37; 385/24; 385/14; 385/129; 385/131; 385/39; 385/42; 359/115; 359/124; 359/130
(58) Field of Search .............................. 385/31, 37, 24, 385/39, 42, 14, 129, 131; 359/115, 124, 130

(56) References Cited

U.S. PATENT DOCUMENTS

| | | | |
|---|---|---|---|
| 4,111,524 A | 9/1978 | Tomlinson, III | 385/37 X |
| 4,153,330 A | 5/1979 | Tomlinson, III | 385/37 X |
| 4,198,117 A | 4/1980 | Kobayashi | 385/37 X |
| 4,274,706 A | 6/1981 | Tangonan | 385/37 X |
| 4,279,464 A | 7/1981 | Colombini | 385/37 X |
| 4,299,488 A | 11/1981 | Tomlinson, III | 359/124 X |
| 4,343,532 A | 8/1982 | Palmer | 385/37 X |
| 4,387,955 A | 6/1983 | Ludman et al. | 359/37 X |
| 4,479,697 A | 10/1984 | Kapany et al. | 385/37 X |

(List continued on next page.)

OTHER PUBLICATIONS

G. R. Harrison, Ph.D., Sc.D. et al., Practical Spectroscopy, Chapter 4—Diffraction–Grating Spectrographs, Prentice–Hall (1948).

W. J. Tomlinson, Wavelength multiplexing in multimode optical fibers, Applied Optics, vol. 16, No. 8 (Aug. 1977).

W.J. Tomlinson et al., Optical multiplexer for multimode fiber transmission systems, Appl. Phys. Lett., vol. 31, No. 3 (Aug. 1977).

W. J. Tomlinson et al., Optical wavelength–division–multiplexer for the 1–1.4 μm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

(List continued on next page.)

*Primary Examiner*—Brian Healy
(74) *Attorney, Agent, or Firm*—Hunton & Williams

(57) ABSTRACT

A variety of wavelength division multiplexing/ demultiplexing devices are disclosed. In one embodiment, an improved wavelength division multiplexing for receiving a plurality of diverging monochromatic optical beams, for combining the plurality of diverging monochromatic optical beams into a converging multiplexed, polychromatic optical beam, and for transmitting the converging, multiplexed, polychromatic optical beam. The concave diffraction grating can be formed in a variety of ways such as, for example, in a polymer material with a reflective surface. Alternatively, the concave diffraction grating may be etched into a rigid material with a reflective surface.

28 Claims, 9 Drawing Sheets

U.S. PATENT DOCUMENTS

| | | | |
|---|---|---|---|
| 4,522,462 A | | 6/1985 | Large et al. ............... 385/37 X |
| 4,583,820 A | | 4/1986 | Flamand et al. .......... 385/37 X |
| 4,622,662 A | | 11/1986 | Laude et al. .............. 385/37 X |
| 4,626,069 A | | 12/1986 | Dammann et al. ........ 385/37 X |
| 4,634,215 A | | 1/1987 | Reule ........................ 385/37 X |
| 4,643,519 A | | 2/1987 | Bussard et al. ........... 385/37 X |
| 4,652,080 A | | 3/1987 | Carter et al. .............. 385/37 X |
| 4,671,607 A | | 6/1987 | Laude ....................... 385/37 X |
| 4,703,472 A | * | 10/1987 | Blumentritt et al. ...... 385/37 X |
| 4,707,056 A | * | 11/1987 | Bittner ...................... 385/14 X |
| 4,708,425 A | | 11/1987 | Gouali et al. ............. 385/33 X |
| 4,726,645 A | | 2/1988 | Yamashita et al. ........ 385/37 X |
| 4,740,951 A | | 4/1988 | Lizet et al. ................ 385/37 X |
| 4,741,588 A | | 5/1988 | Nicia et al. ............... 385/37 X |
| 4,744,618 A | | 5/1988 | Mahlein .................... 385/37 X |
| 4,746,186 A | | 5/1988 | Nicia ........................ 385/37 X |
| 4,748,614 A | | 5/1988 | Dammann et al. ........ 385/37 X |
| 4,749,247 A | | 6/1988 | Large ........................ 385/37 X |
| 4,752,108 A | | 6/1988 | Vollmer .................. 385/129 X |
| 4,760,569 A | | 7/1988 | Mahlein .................... 385/37 X |
| 4,763,969 A | | 8/1988 | Khoe et al. ............... 385/37 X |
| 4,773,063 A | | 9/1988 | Hunsperger et al. ...... 385/37 X |
| 4,784,935 A | * | 11/1988 | Ehrfeld et al. .............. 430/321 |
| 4,786,133 A | | 11/1988 | Gidon et al. .............. 385/37 X |
| 4,819,224 A | | 4/1989 | Laude ....................... 385/37 X |
| 4,834,485 A | | 5/1989 | Lee ........................... 385/33 X |
| 4,836,634 A | | 6/1989 | Laude ....................... 385/37 X |
| 4,857,726 A | | 8/1989 | Kinney et al. .............. 250/226 |
| 4,923,271 A | | 5/1990 | Henry et al. .............. 385/37 X |
| 4,926,412 A | | 5/1990 | Jannson et al. ........... 385/37 X |
| 4,930,855 A | | 6/1990 | Clark et al. ............... 385/37 X |
| 4,934,784 A | | 6/1990 | Kapany et al. ............ 385/33 X |
| 4,999,489 A | * | 3/1991 | Huggins ..................... 250/226 |
| 5,026,131 A | | 6/1991 | Jannson et al. ........... 385/33 X |
| 5,107,359 A | | 4/1992 | Ohuchida ................. 385/37 X |
| 5,170,451 A | | 12/1992 | Ohshima ..................... 385/43 |
| 5,228,103 A | | 7/1993 | Chen et al. ................... 385/14 |
| 5,278,687 A | | 1/1994 | Jannson et al. ............. 359/125 |
| 5,355,237 A | | 10/1994 | Lang et al. ................. 359/130 |
| 5,363,220 A | | 11/1994 | Kuwayama et al. ........... 359/3 |
| 5,440,416 A | | 8/1995 | Cohen et al. ............... 359/127 |
| 5,442,472 A | | 8/1995 | Skrobko ...................... 359/110 |
| 5,450,510 A | | 9/1995 | Boord et al. ................... 385/37 |
| 5,457,573 A | | 10/1995 | Iida et al. ................... 359/569 |
| 5,500,910 A | | 3/1996 | Boudreau et al. ............. 385/24 |
| 5,513,289 A | | 4/1996 | Hosokawa et al. ........... 385/33 |
| 5,526,155 A | | 6/1996 | Knox et al. ................. 359/130 |
| 5,541,774 A | | 7/1996 | Blankenbecler ............. 359/653 |
| 5,555,334 A | | 9/1996 | Ohnishi et al. ................ 385/93 |
| 5,583,683 A | | 12/1996 | Scobey ....................... 359/127 |
| 5,606,434 A | | 2/1997 | Feldman et al. .......... 385/37 X |
| 5,657,406 A | | 8/1997 | Ball ............................. 385/24 |
| 5,703,722 A | | 12/1997 | Blankenbecler ............. 359/653 |
| 5,742,416 A | | 4/1998 | Mizrahi ...................... 359/134 |
| 5,745,270 A | | 4/1998 | Koch .......................... 359/124 |
| 5,745,271 A | | 4/1998 | Ford et al. .................. 359/130 |
| 5,745,612 A | | 4/1998 | Wang et al. ................... 385/24 |
| 5,748,350 A | | 5/1998 | Pan et al. .................... 359/130 |
| 5,748,815 A | | 5/1998 | Hamel et al. .................. 385/37 |
| 5,768,450 A | | 6/1998 | Bhagavatula ................. 385/24 |
| 5,777,763 A | | 7/1998 | Tomlinson, III ............ 359/130 |
| 5,880,834 A | | 3/1999 | Chrisp ........................ 356/328 |
| 5,999,672 A | * | 12/1999 | Hunter et al. .................. 385/37 |
| 6,011,884 A | * | 1/2000 | Dueck et al. .................. 385/24 |
| 6,243,513 B1 | * | 6/2001 | Wade ........................... 385/24 |
| 6,263,135 B1 | * | 7/2001 | Wade ........................... 385/37 |
| 6,289,155 B1 | * | 9/2001 | Wade ........................... 385/37 |
| 6,298,182 B1 | * | 10/2001 | Wade ........................... 385/24 |

OTHER PUBLICATIONS

K. Aoyama et al., Low–loss optical demultiplexer for WDM system in the 0.8 µm wavelength region, Applied Optics, vol. 18, No. 15 (Aug. 15, 1979).

R. Watanabe et al., Optical Demuliplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fibers–Optic Communications, Journal of Quantum Electronics, vol. QE–16, No. 1 (Jan. 1980).

Y. Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexing with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and – demultiplexing by using a substrate–mode grating pair, Optics Letters, vol. 17, No. 22 (Nov. 15, 1992).

M. Wu et al., Design Considerations for Rowland Circle Grating Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channels spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded—Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabrication of Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjuction with numtiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D.R. Wisely, 32 Channel WDM Multiplexer with 1nm Channel Spacing and 0.7 nm Bandwidth, Electronics Letters, vol. 27, No. 6, pp. 520–521 (Mar. 14, 1991).

C. Koeppen, et al., High Resolution Fiber Grating Optical Network Monitor, National Fiber Optic Engineers Conference, Technical Proceedings, vol. II (Sep. 13–17, 1998).

M.J. Cohen, et al. InGaAs photodiode arrays for DWDM monitoring and receiving, Lightwave, pp. 99–101 (Aug. 1999).

J.P. Laude, Wavelength Division Multiplexing, pp. 116–117, (1993).

Sami Hendow, et al., Performance Monitors Enable Remote Channel Management, Lightwave Special Reports, pp. 62–66 and 72 (Feb. 2000).

Adrian Meldrum, C– and L–band Channel Monitoring, Lightwave Special Reports, pp. 68–72 (Feb. 2000).

* cited by examiner

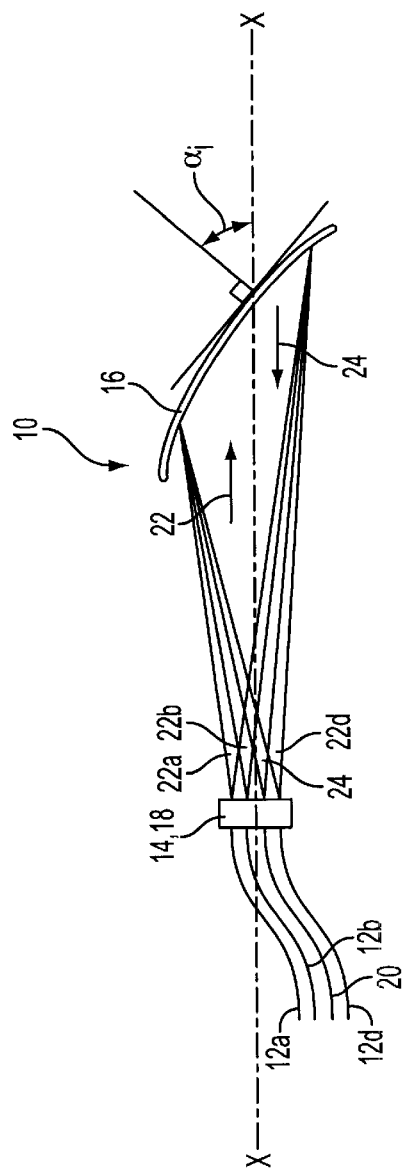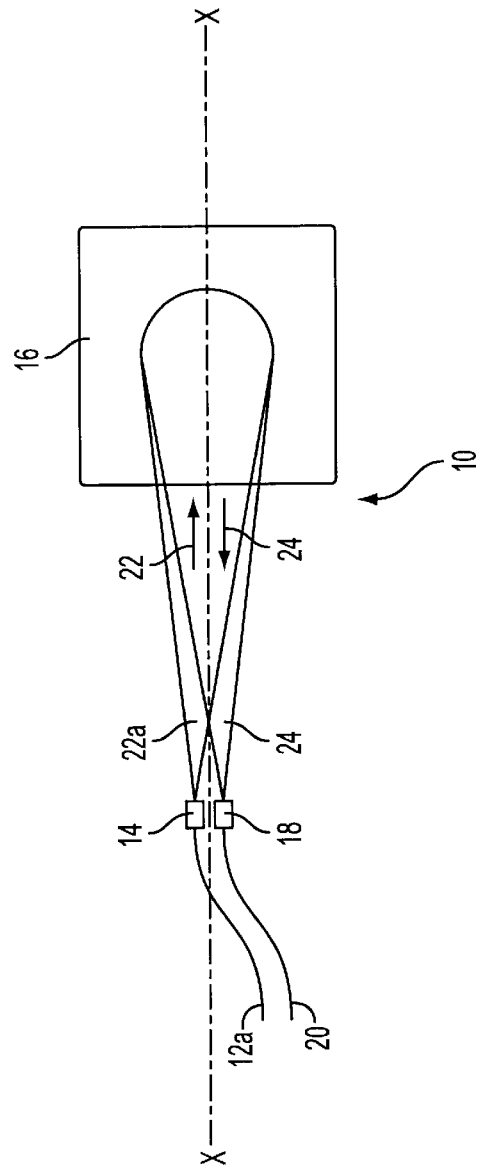

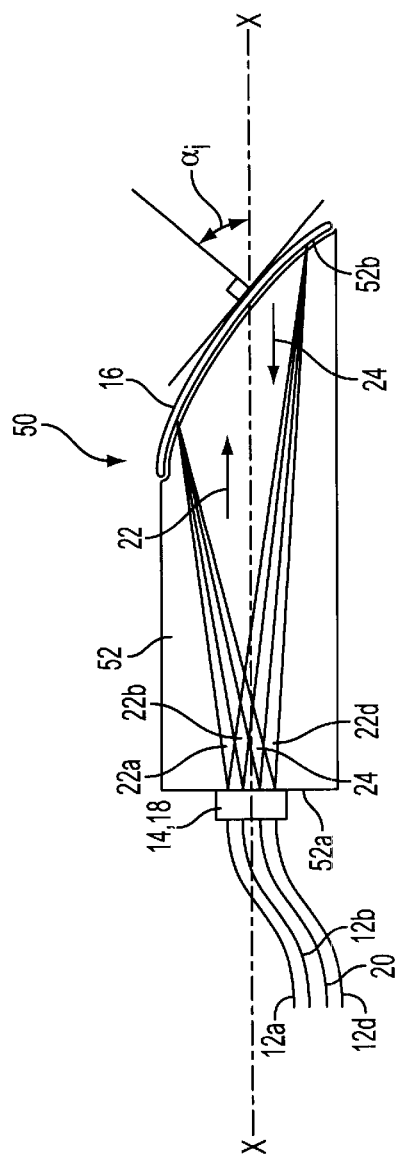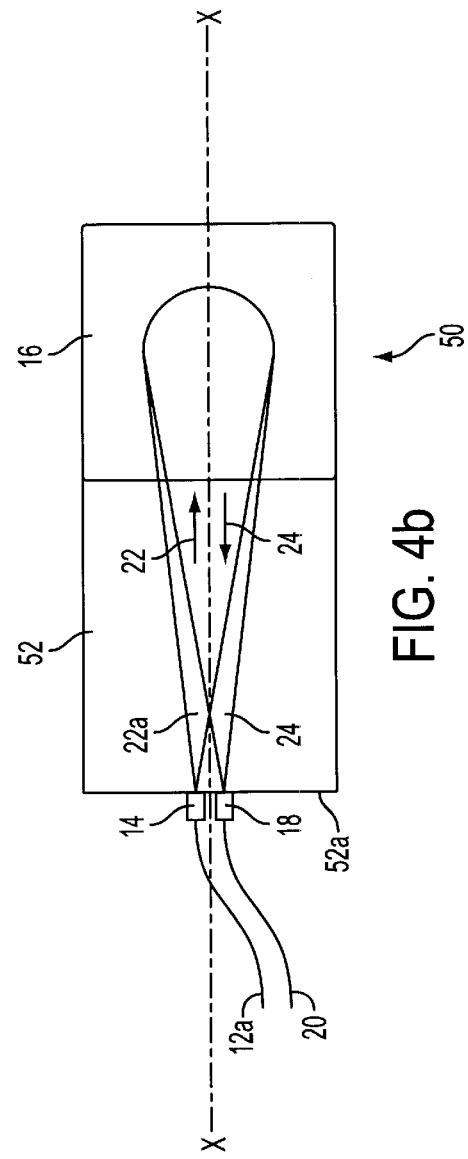

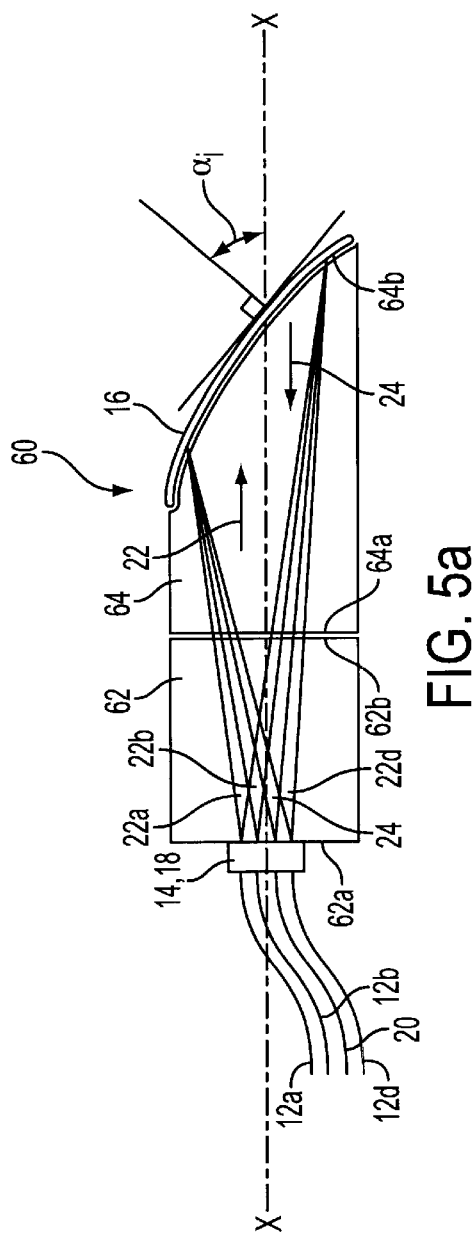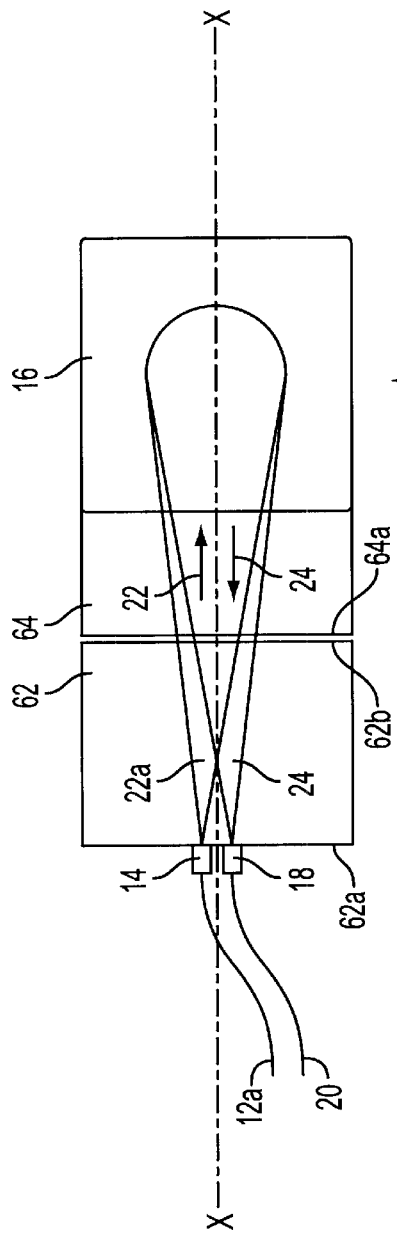

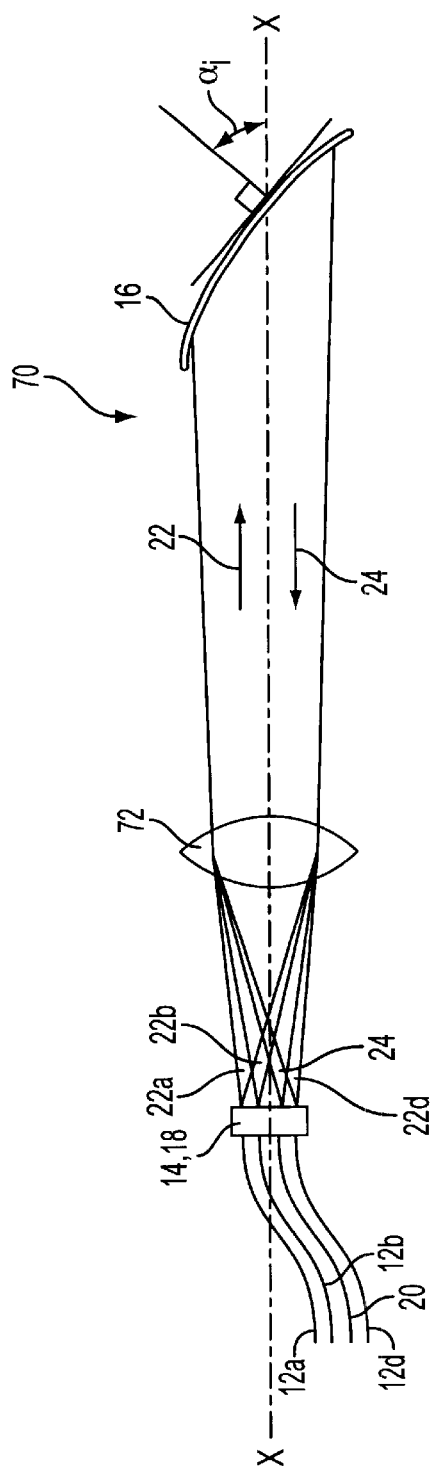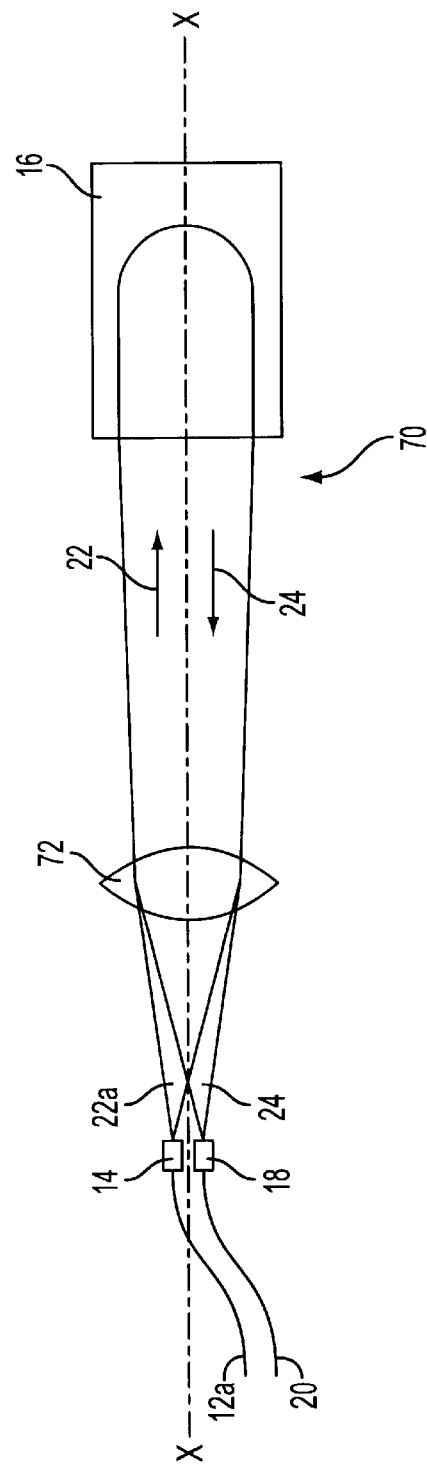
FIG. 6a
FIG. 6b

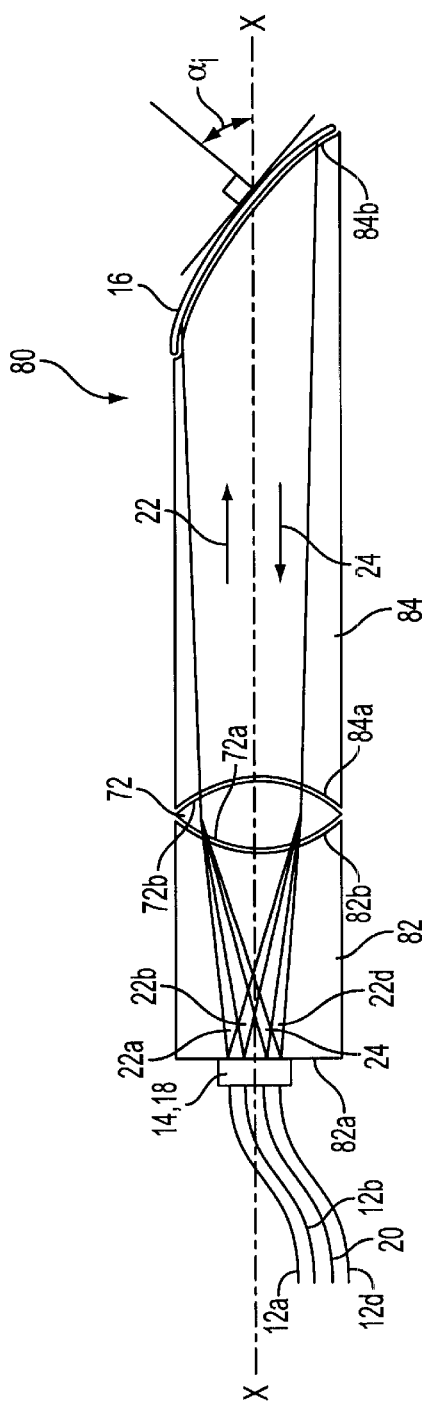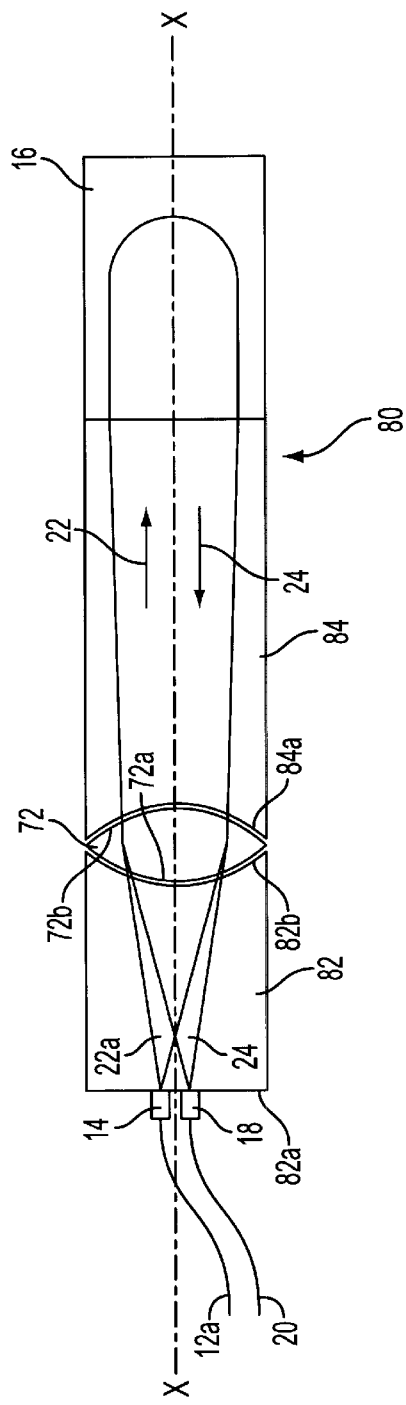

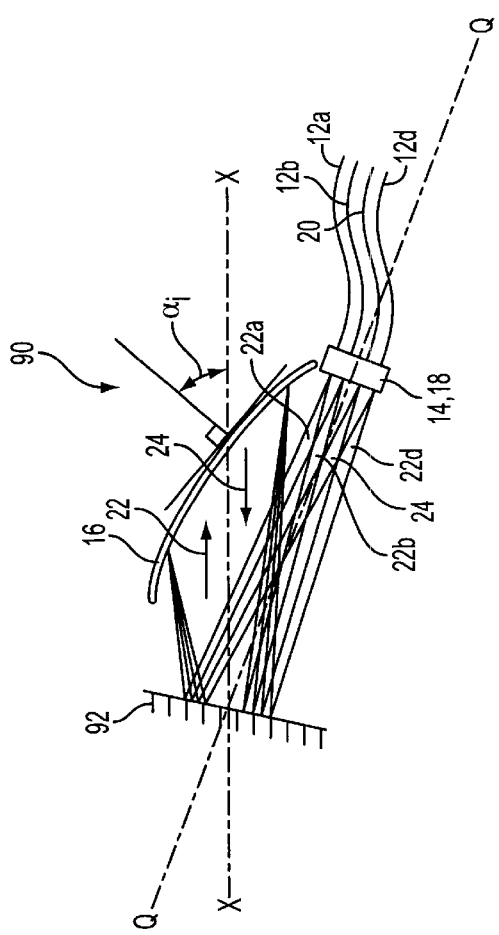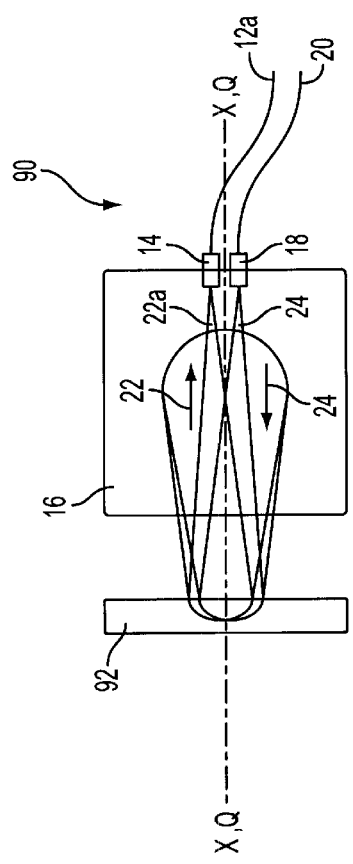
FIG. 8a
FIG. 8b

WAVELENGTH DIVISION MULTIPLEXING/DEMULTIPLEXING DEVICES HAVING CONCAVE DIFFRACTION GRATINGS

CROSS-REFERENCE TO RELATED APPLICATIONS

This patent application is a continuation-in-part application of U.S. patent application Ser. No. 09/323,094 filed Jun. 1, 1999, now U.S. Pat. No. 6,263,135; U.S. patent application Ser. No. 09/382,492, filed Aug. 25, 1999, now pending, U.S. patent application Ser. No. 09/363,041, filed Jul. 29, 1999, now U.S. Pat. No. 6,243,513; and U.S. patent application Ser. No. 09/392,670, filed Sep. 8, 1999, now U.S. Pat. No. 6,298,182; U.S. patent application Ser. No. 08/990,197, filed Dec. 13, 1997, now U.S. Pat. No. 6,011,884 U.S. patent application Ser. No. 08/990,199, filed Dec. 13, 1997 now U.S. Pat. No. 5,999,672; all of which are hereby incorporated by reference herein in their entirety.

FIELD OF THE INVENTION

The present invention relates generally to wavelength division multiplexing and demultiplexing and, more particularly, to improved wavelength division multiplexing/demultiplexing devices having concave diffraction gratings.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels into and out of, respectively, an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, *Applied Optics*, Vol. 16, No. 8, pp. 2180–2194 (August 1977); (2) A. C. Livanos et al., *Applied Physics Letters*, Vol. 30, No. 10, pp. 519–521 (May 15, 1977); (3) H. Ishio et al., *Journal of Lightwave Technology*, Vol 2, No. 4, pp. 448–463 (August 1984); (4) H. Obara et al., *Electronics Letters*, Vol. 28, No. 13, pp. 1268–1270 (Jun. 18, 1992); (5) A. E. Willner et al., *IEEE Photonics Technology Letters*, Vol. 5, No. 7, pp. 838–841 (July 1993); and (6) Y. T. Huang et al., *Optical Letters*, Vol. 17, No. 22, pp. 1629–1631 (Nov. 15, 1992), all disclose some form of WDM device and/or method. However, most of the WDM devices and/or methods disclosed in the above-listed publications are classical optics-based WDM approaches which employ very basic lenses that are adequate only for use with multimode optical fibers and are inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, due to the very basic lenses employed therein, WDM devices incorporating the principles set forth in the classical optics-based WDM approaches disclosed in the above-listed publications are unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of these very basic lenses, which are typically formed of standard optical glass materials.

One proposed solution to the above-described optical imaging problem has been to add additional lenses formed of standard optical glass materials to WDM devices, thereby resulting in WDM devices having doublet, triplet, and even higher number lens configurations. By adding these additional lenses to WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in WDM devices. The use of these gradient refractive index lenses results in a significant improvement in the quality of the imaging system within WDM devices. However, costs associated with manufacturing these gradient refractive index lenses is significantly greater than the costs associated with manufacturing standard homogeneous refractive index lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide improved wavelength division multiplexing/demultiplexing devices using concave diffraction gratings.

The above-stated primary object, as well as other objects, features, and advantages, of the present invention will become readily apparent to those of ordinary skill in the art from the following summary and detailed descriptions, as well as the appended drawings. While the present invention is described below with reference to preferred embodiment(s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, an improved wavelength division multiplexing device is provided. In a preferred embodiment, the improved wavelength division multiplexing device comprises a concave diffraction grating for receiving a plurality of diverging monochromatic optical beams, for combining the plurality of diverging monochromatic optical beams into a converging multiplexed, polychromatic optical beam, and for transmitting the converging, multiplexed, polychromatic optical beam. The concave diffraction grating can be formed in a variety of ways such as, for example, in a polymer material with a reflective surface. Alternatively, the concave diffraction grating may be etched into a rigid material with a reflective surface.

In accordance with other aspects of the present invention, the plurality of diverging monochromatic optical beams are traveling along a first direction to the concave diffraction grating, and the converging, multiplexed, polychromatic optical beam is traveling along a second direction from the concave diffraction grating, with the second direction being substantially opposite the first direction. If such is the case, the concave diffraction grating is beneficially a reflective concave diffraction grating oriented at the Littrow diffraction angle with respect to the first and second directions.

In accordance with further aspects of the present invention, the plurality of diverging monochromatic optical beams are traveling along a first direction to the concave diffraction grating, and the converging, multiplexed, polychromatic optical beam is traveling along a second direction from the concave diffraction grating, with the second direction being different from the first direction. If such is the case, the concave diffraction grating is beneficially a reflective concave diffraction grating oriented at a diffraction angle such that the first direction and the second direction meet to form an acute angle.

According to the present invention, an integrated wavelength division multiplexing device is also provided. In a preferred embodiment, the integrated wavelength division multiplexing device comprises a concave diffraction grating for combining a plurality of diverging monochromatic optical beams into a converging multiplexed, polychromatic optical beam, and at least one boot lens for transmitting the plurality of diverging monochromatic optical beams to the concave diffraction grating, and for transmitting the converging, multiplexed, polychromatic optical beam from the concave diffraction grating.

In accordance with other aspects of the present invention, a first of the at least one boot lens beneficially has a convex interface surface, and the concave diffraction grating is formed at the convex interface surface of the first of the at least one boot lens. For example, the concave diffraction grating may be formed in a polymer material, have a reflective surface, and be affixed to the convex interface surface of the first of the at least one boot lens. Alternatively, the concave diffraction grating may be etched into a rigid material, have a reflective surface, and be affixed to the convex interface surface of the first of the at least one boot lens. Alternatively still, the concave diffraction grating may have a reflective surface and be formed in the convex interface surface of the first of the at least one boot lens.

In accordance with further aspects of the present invention, the plurality of diverging monochromatic optical beams are transmitted by the at least one boot lens along a first direction to the concave diffraction grating, and the converging, multiplexed, polychromatic optical beam is transmitted by the at least one boot lens along a second direction from the concave diffraction grating, with the second direction being substantially opposite the first direction. If such is the case, the concave diffraction grating is beneficially a reflective concave diffraction grating oriented at the Littrow diffraction angle with respect to the first and second directions.

In accordance with still further aspects of the present invention, the plurality of diverging monochromatic optical beams are transmitted by a first of the at least one boot lens along a first direction to the concave diffraction grating, and the converging, multiplexed, polychromatic optical beam is transmitted by a second of the at least one boot lens along a second direction from the concave diffraction grating, with the second direction being different from the first direction. If such is the case, the concave diffraction grating is beneficially a reflective concave diffraction grating oriented at a diffraction angle such that the first direction and the second direction meet to form an acute angle.

In accordance with still further aspects of the present invention, the integrated wavelength division multiplexing device further comprises at least one focusing lens affixed to the at least one boot lens for aiding in the transmission of the plurality of diverging monochromatic optical beams to the concave diffraction grating, and for aiding in the transmission of the converging, multiplexed, polychromatic optical beam from the concave diffraction grating.

In accordance with still further aspects of the present invention, the integrated wavelength division multiplexing device further comprises at least one reflecting surface affixed to the at least one boot lens for reflecting the plurality of diverging monochromatic optical beams being transmitted to the concave diffraction grating, and for reflecting the converging, multiplexed, polychromatic optical beam being transmitted from the concave diffraction grating.

In accordance with still further aspects of the present invention, the integrated wavelength division multiplexing device further comprises at least one prism affixed to the at least one boot lens for aiding in the transmission of the plurality of diverging monochromatic optical beams to the concave diffraction grating, and for aiding in the transmission of the converging, multiplexed, polychromatic optical beam from the concave diffraction grating. In this case, the integrated wavelength division multiplexing device may further comprise at least one reflecting surface affixed to the at least one prism for reflecting the plurality of diverging monochromatic optical beams being transmitted to the concave diffraction grating, and for reflecting the converging, multiplexed, polychromatic optical beam being transmitted from the concave diffraction grating.

At this point it should be noted that the above-described improved wavelength division multiplexing device and integrated wavelength division multiplexing device are bidirectional devices. Thus, the improved wavelength division multiplexing device can also be an improved wavelength division demultiplexing device, and the integrated wavelength division multiplexing device can also be an integrated wavelength division demultiplexing device.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1a is a side view of a wavelength division multiplexing device having a reflective concave diffraction grating in accordance with the present invention.

FIG. 1b is a top view of the wavelength division multiplexing device shown in FIG. 1a.

FIG. 1c is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 2b is a perspective view of a coupling device containing a plurality of photodetectors for replacing the plurality of optical input fibers in the demultiplexing device shown in FIG. 3a.

FIG. 3b is a top view of the wavelength division multiplexing device shown in FIG. 3a.

FIG. 4a is a side view of an integrated wavelength division multiplexing device having a single boot lens and a reflective concave diffraction grating in accordance with the present invention.

FIG. 4b is a top view of the integrated wavelength division multiplexing device shown in FIG. 4a.

FIG. 5a is a side view of an integrated wavelength division multiplexing device having a prism, a boot lens, and a reflective concave diffraction grating in accordance with the present invention.

FIG. 5b is a top view of the integrated wavelength division multiplexing device shown in FIG. 5a.

FIG. 6a is a side view of a wavelength division multiplexing device having a bi-convex focusing lens and a reflective concave diffraction grating in accordance with the present invention.

FIG. 6b is a top view of the integrated wavelength division multiplexing device shown in FIG. 6a.

FIG. 7a is a side view of an integrated wavelength division multiplexing device having a bi-convex focusing lens, multiple boot lenses, and a reflective concave diffraction grating in accordance with the present invention.

FIG. 7b is a top view of the integrated wavelength division multiplexing device shown in FIG. 7a.

FIG. 8a is a side view of a wavelength division multiplexing device having a reflective concave diffraction grating and an additional reflecting surface in accordance with the present invention.

FIG. 8b is a top view of the wavelength division multiplexing device shown in FIG. 8a.

DETAILED DESCRIPTION OF PREFERRED EMBODIMENT(S)

Figure 2A:
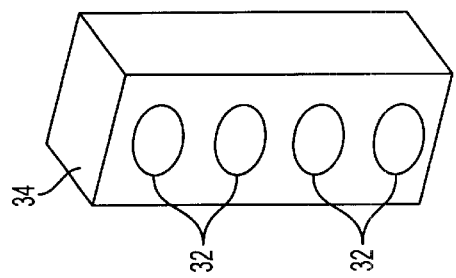

Referring to FIGS. 1a and 1b, there are shown a side view and a top view, respectively, of a preferred embodiment of a wavelength division multiplexing device 10 in accordance with the present invention. The multiplexing device 10 comprises a plurality of optical input fibers 12, an input fiber coupling device 14, a reflective concave diffraction grating 16, an output fiber coupling device 18, and a single optical output fiber 20. All of the above-identified components of the multiplexing device 10 are disposed along an optical axis X-X of the multiplexing device 10, as will be described in more detail below.

At this point it should be noted that the optical input fibers 12 and the optical output fiber 20, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Figure 1C:
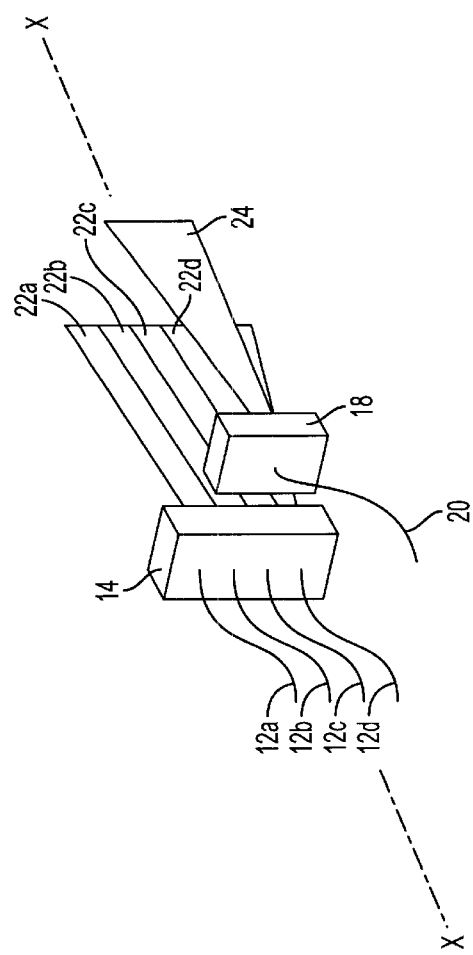

Returning to FIGS. 1a and 1b, the plurality of optical input fibers 12 are grouped into a one-dimensional input fiber array (i.e., a 1×4 array is shown, but the input fiber array may include one hundred or more input fibers and is limited only by the spectral bandwidth of the diffraction grating and channel spacing, as described in more detail below) by the input fiber coupling device 14, while the single optical output fiber 20 is secured to the output fiber coupling device 18. Both the input fiber coupling device 14 and the output fiber coupling device 18 are used for purposes of ease of optical fiber handling and precision placement, and can be formed of, for example, a silicon V-groove assembly. Referring to FIG. 1c, there is shown a perspective end view of a portion of the multiplexing device 10 revealing how the plurality of optical input fibers 12 are grouped into the one-dimensional input fiber array by the input fiber coupling device 14, and how the single optical output fiber 20 is secured to the output fiber coupling device 18. FIG. 1c also shows a monochromatic optical input beam 22 being transmitted from each of the plurality of optical input fibers 12, and a single multiplexed, polychromatic optical output beam 24 being transmitted to the single optical output fiber 20.

Each of the monochromatic optical input beams 22 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 22 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 22 are appropriately preselected such that the data channels do not interfere with each other (i.e., there is sufficient channel spacing), and the optical transmission losses through both the optical input fibers 12 and the optical output fiber 20 are low, as is also well known in the art.

The single multiplexed, polychromatic optical output beam 24 being transmitted to the single optical output fiber 20 is carrying a plurality of channels of data at the unique wavelengths of each of the plurality of monochromatic optical input beams 22. The plurality of monochromatic optical input beams 22 are combined into the single multiplexed, polychromatic optical output beam 24 by the reflective concave diffraction grating 16, as will be described in more detail below.

At this point it should be noted that the input fiber coupling device 14 and the output fiber coupling device 18 are disposed offset from, but symmetrically about, the optical axis X-X of the multiplexing device 10 so as to insure that the single multiplexed, polychromatic optical output beam 24 is directed to the single optical output fiber 20 secured to the output fiber coupling device 18, and not to any of the plurality of optical input fibers 12 secured to the input fiber coupling device 14, or anywhere else. This offset spacing of the input fiber coupling device 14 and the output fiber coupling device 18 is determined based upon the characteristics of the reflective concave diffraction grating 16 and the wavelengths of each of the monochromatic optical input beams 22.

Referring again to FIGS. 1a and 1b, each of the plurality of monochromatic optical input beams 22 are transmitted from their corresponding optical input fiber 12 into the air space between the input fiber coupling device 14 and the reflective concave diffraction grating 16. Within this air space, the plurality of monochromatic optical input beams 22 are expanded in diameter until they become incident upon the reflective concave diffraction grating 16. The reflective concave diffraction grating 16 operates to angularly disperse the plurality of monochromatic optical input beams 22 by an amount that is dependent upon the wavelength of each of the plurality of monochromatic optical input beams 22. Further, the reflective concave diffraction grating 16 is oriented at a special angle (i.e., the Littrow diffraction angle, $\alpha_i$) relative to the optical axis X-X of the multiplexing device 10 in order to obtain the Littrow diffraction condition for an optical beam having a wavelength that lies within or near the wavelength range of the plurality of monochromatic optical input beams 22. The Littrow diffraction condition requires that an optical beam be incident on and reflected back from a reflective diffraction grating at the exact same angle. Therefore, it will be readily apparent to one skilled in the art that the reflective concave diffraction grating 16 is used to obtain near-Littrow diffraction for each of the plurality of monochromatic optical input beams 22.

The Littrow diffraction angle, $\alpha_i$, is determined by the well-known diffraction grating equation, $$m\lambda = 2d(\sin \alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 10. For example, variables affecting the Littrow diffraction angle, $\alpha_i$, include the desired grating diffraction order, the grating pitch (i.e., the number of grating grooves per millimeter), the grating blaze angle, the number of data channels, the spacing of the data channels, and the wavelength range of the multiplexing device 10.

At this point it should be noted that the reflective concave diffraction grating 16 can be formed from a variety of ;materials and by a variety of techniques. For example, the reflective concave diffraction grating 16 can be formed by a three-dimensional hologram in a polymer medium, or by replicating a mechanically ruled master with a polymer material. In both cases, the polymer is overcoated with a thin, highly reflective metal layer such as, for example, gold or aluminum. Alternatively, the reflective concave diffraction grating 16 can be formed by chemically etching into a concave material such as, for example, glass or silicon, which is also overcoated with a thin, highly reflective metal layer such as, for example, gold or aluminum.

As previously mentioned, the reflective concave diffraction grating 16 operates to angularly disperse the plurality of collimated, monochromatic optical input beams 22. Thus, the reflective concave diffraction grating 16 removes the angular separation of the plurality of monochromatic optical input beams 22, and reflects a single polychromatic optical output beam 24 back towards the output fiber coupling device 18, and hence towards the single optical output fiber 20 secured therein. The single polychromatic optical output beam 24 contains each of the unique wavelengths of the plurality of monochromatic optical input beams 22. Thus, the single polychromatic optical output beam 24 is a single multiplexed, polychromatic optical output beam 24.

Also, due to the concave shape of the reflective concave diffraction grating 16, the single multiplexed, polychromatic optical output beam 24 that is reflected back towards the output fiber coupling device 18, and hence towards the single optical output fiber 20 secured therein, exhibits a focus. That is, the concave shape of the reflective concave diffraction grating 16 imparts a focus on the single multiplexed, polychromatic optical output beam 24. Thus, the single multiplexed, polychromatic optical output beam 24 is focused down towards the output fiber coupling device 18, and hence towards the single optical output fiber 20 secured therein, whereby the single multiplexed, polychromatic optical output beam 24 is coupled into the single optical output fiber 20 for transmission therethrough.

At this point it should be noted that the plurality of optical input fibers 12 could be replaced in the multiplexing device 10 by a corresponding plurality of laser diodes 32 secured within a coupling device 34, such as shown in FIG. 2a. The coupling device 34 performs a similar function to the input fiber coupling device 14, that being to precisely group the plurality of laser diodes 32 into a one-dimensional input array. The plurality of laser diodes 32 are used in place of the plurality of optical input fibers 12 to transmit the plurality of monochromatic optical input beams 22 to the multiplexing device 10. The array of laser diodes 32 may operate alone, or may be used with appropriate focusing lenses to provide the best coupling and the lowest amount of signal loss and channel crosstalk.

Figure 3A:
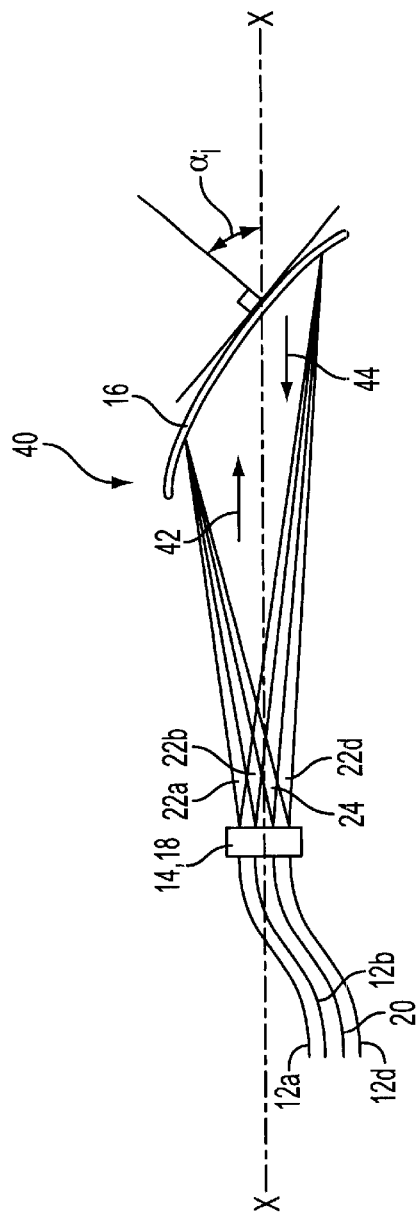
FIG. 3a is a side view of a wavelength division demultiplexing device having a reflective concave diffraction grating in accordance with the present invention.
Figure 3B:
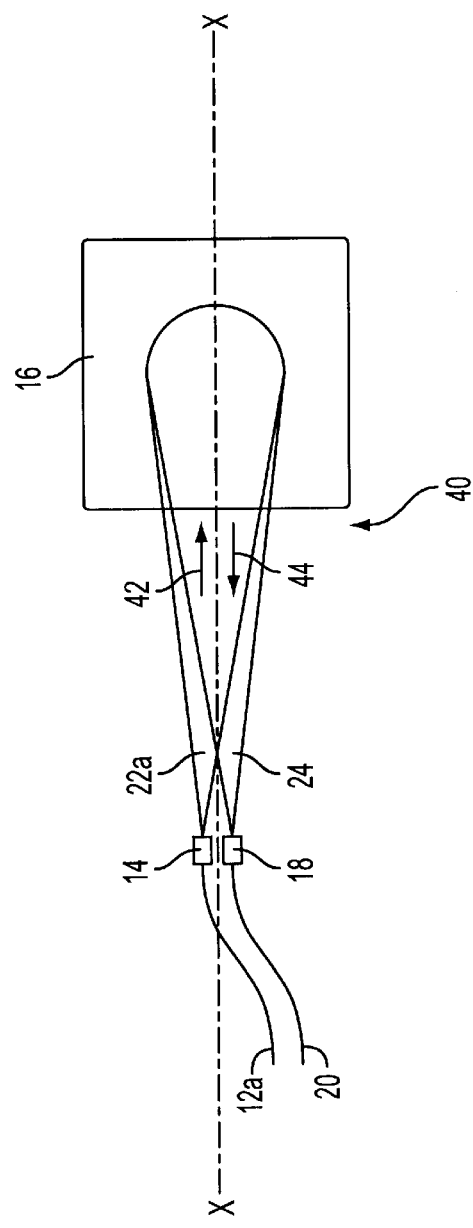

At this point it should be noted that the multiplexing device 10, as well as all of the multiplexing devices described herein, may be operated in a converse configuration as a demultiplexing device 40, such as shown in FIGS. 3a and 3b. The demultiplexing device 40 is physically identical to the multiplexing device 10, and is therefore numerically identified as such. However, the demultiplexing device 40 is functionally opposite to the multiplexing device 10. That is, a single multiplexed, polychromatic optical input beam 42 is transmitted from the single optical fiber 20, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. The single multiplexed, polychromatic optical input beam 42 is separated into the plurality of monochromatic optical output beams 44 by the reflective concave diffraction grating 16. Thus, the reflective concave diffraction grating 16 operates to perform a demultiplexing function.

Figure 2B:
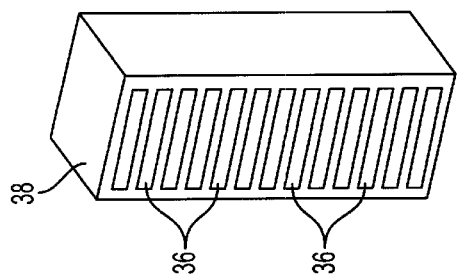

At this point it should be noted that the plurality of optical fibers 12 could be replaced in the demultiplexing device 40 by a corresponding plurality of photodetectors 36 secured within a coupling device 38, such as shown in FIG. 2b. The coupling device 38 performs a similar function to the fiber coupling device 14, that being to precisely group the plurality of photodetectors 36 into a one-dimensional input array. The plurality of photodetectors 36 are used in place of the plurality of optical fibers 12 to receive the plurality of monochromatic optical output beams 44 from the demultiplexing device 40. The array of photodetectors 36 may operate alone, or may be used with appropriate focusing lenses to provide the best coupling and the lowest amount of signal loss and channel crosstalk.

Referring to FIGS. 4a and 4b, there are shown a side view and a top view, respectively, of an alternate embodiment of a wavelength division multiplexing device 50 in accordance with the present invention. The multiplexing device 50 is physically identical to the multiplexing device 10, except for the addition of a boot lens 52 between the fiber coupling devices 14 and 18 and the reflective concave diffraction grating 16. The boot lens 52 is preferably fabricated of a homogeneous refractive index material such as, for example, fused silica (manufactured by Schott Glass Technologies with n=1.444 @1550 nm), although numerous other optical glass/polymer materials may also be used.

The boot lens 52 has a planar front surface 52a for mating with the fiber coupling devices 14 and 18 and the associated secured optical fibers 12 and 20, respectively. The fiber coupling devices 14 and 18 and the secured optical fibers 12 and 20 may be either abutted against the planar front surface 52a or affixed to the planar front surface 52a using optical cement or some other optically transparent bonding technique, depending upon system mobility requirements and optical beam alignment and loss considerations.

The boot lens 52 also has a convex back surface 52b. As with the multiplexing device 10, the reflective concave diffraction grating 16 can be formed using a separate material, and this material can then be joined or affixed to the convex back surface 52b of the boot lens 52 using optical cement or some other optically transparent bonding technique. Alternatively, the reflective concave diffraction grating 16 can be formed directly on the convex back surface 52b of the boot lens 52, thereby avoiding the joining or affixing of the reflective concave diffraction grating 16 to the convex back surface 52b of the boot lens 52. In either case, the reflective concave diffraction grating 16 and the boot lens 52 are integrated to form a compact, rigid, and environmentally and thermally stable multiplexing device 50. The integrated nature of this multiplexing device 50 is particularly useful for maintaining component alignment, which provides long-term performance in contrast to some non-integrated air-spaced devices that characteristically degrade in alignment and therefore performance over time.

The multiplexing device 50 is functionally identical to the multiplexing device 10, except for a slight decrease in optical beam transmission efficiency due to the addition of the boot lens 52. However, even with this slight decrease in optical beam transmission efficiency, the optical performance of the multiplexing device 50 is still exceptional.

Referring to FIGS. 5a and 5b, there are shown a side view and a top view, respectively, of an alternate embodiment of a wavelength division multiplexing device 60 in accordance with the present invention. The multiplexing device 60 is physically identical to the multiplexing device 50, except that instead of the single boot lens 52 in the multiplexing device 50, the multiplexing device 60 has a prism 62 disposed adjacent the fiber coupling devices 14 and 18 and a boot lens 64 disposed adjacent the reflective concave diffraction grating 16. The prism 62 and the boot lens 64 are preferably fabricated of a homogeneous refractive index material such as, for example, fused silica (manufactured by Schott Glass Technologies with n=1.444@1550 nm), although numerous other optical glass/polymer materials may also be used.

The prism 62 has a planar front surface 62a for mating with the fiber coupling devices 14 and 18 and the associated secured optical fibers 12 and 20, respectively. The fiber coupling devices 14 and 18 and the secured optical fibers 12 and 20 may be either abutted against the planar front surface 62a or affixed to the planar front surface 62a using optical cement or some other optically transparent bonding technique, depending upon system mobility requirements and optical beam alignment and loss considerations.

The prism 62 also has a planar back surface 62b for mating with a planar front surface 64a of the boot lens 64.

The planar back surface 62b of the prism 62 is typically joined or affixed to the planar front surface 64a of the boot lens 64 using optical cement or some other optically transparent bonding technique.

The boot lens 64 has a convex back surface 64b. As with the multiplexing device 50, the reflective concave diffraction grating 16 can be formed using a separate material, and this material can then be joined or affixed to the convex back surface 64b of the boot lens 64 using optical cement or some other optically transparent bonding technique. Alternatively, the reflective concave diffraction grating 16 can be formed directly on the convex back surface 64b of the boot lens 64, thereby avoiding the joining or affixing of the reflective concave diffraction grating 16 to the convex back surface 64b of the boot lens 64. In either case, the reflective concave diffraction grating 16 and the boot lens 64 are integrated along with the prism 62 to form a compact, rigid, and environmentally and thermally stable multiplexing device 60. The integrated nature of this multiplexing device 60 is particularly useful for maintaining component alignment, which provides long-term performance in contrast to some non-integrated air-spaced devices that characteristically degrade in alignment and therefore performance over time.

The multiplexing device 60 is functionally identical to the multiplexing device 10, except for a slight decrease in optical beam transmission efficiency due to the addition of the prism 62 and the boot lens 64. However, even with this slight decrease in optical beam transmission efficiency, the optical performance of the multiplexing device 60 is still exceptional. The multiplexing device 60 is also functionally identical to the multiplexing device 50, except for a slight increase in optical beam transmission efficiency due to the additional optical interface between the prism 62 and the boot lens 64. Also, using the prism 62 allows the boot lens 64 to be shorter than the boot lens 52 in the multiplexing device 50, thereby allowing for easier manufacturing of the boot lens 64.

At this point it should be noted that either the prism 62 or the second boot lens 64 may be removed from the multiplexing device 60 so as to create additional alternate embodiments (not shown) which also obtain exceptional optical performance while using the reflective concave diffraction grating 16.

Referring to FIGS. 6a and 6b, there are shown a side view and a top view, respectively, of an alternate embodiment of a wavelength division multiplexing device 70 in accordance with the present invention. The multiplexing device 70 is physically identical to the multiplexing device 10, except for the addition of a bi-convex focusing lens 72 so as to enhance the imaging of both the input optical beams 22 and output optical beam 24 within the multiplexing device 70. That is, the bi-convex focusing lens 72 provides additional imaging capability, thereby increasing the fiber coupling efficiency (FCE) of the multiplexing device 70. In contrast to a measure of insertion loss, the FCE of a WDM device expresses the efficiency of only the optical system of the WDM device for each data channel, without taking into account the efficiency of the diffraction grating. Of course, further increases in the FCE can typically be achieved using doublet, triplet, or even higher number lens configurations. However, a trade-off must be made between an increase in the FCE and the additional cost associated with adding additional lenses, or fabricating lenses having additional curved surfaces.

Referring to FIGS. 7a and 7b, there are shown a side view and a top view, respectively, of an alternate embodiment of a wavelength division multiplexing device 80 in accordance with the present invention. The multiplexing device 80 is physically identical to the multiplexing device 70, except for the addition of a first boot lens 82 between the fiber coupling devices 14 and 18 and the bi-convex focusing lens 72, and a second boot lens 84 between the bi-convex focusing lens 72 and the reflective concave diffraction grating 16. The first boot lens 82 and the second boot lens 84 are preferably fabricated of a homogeneous refractive index material such as, for example, fused silica (manufactured by Schott Glass Technologies with n=1.444@1550 nm), although numerous other optical glass/polymer materials may also be used.

The first boot lens 82 has a planar front surface 82a for mating with the fiber coupling devices 14 and 18 and the associated secured optical fibers 12 and 20, respectively. The fiber coupling devices 14 and 18 and the secured optical fibers 12 and 20 may be either abutted against the planar front surface 82a or affixed to the planar front surface 82a using optical cement or some other optically transparent bonding technique, depending upon system mobility requirements and optical beam alignment and loss considerations.

The first boot lens 82 also has a concave back surface 82b for mating with a convex front surface 72a of the bi-convex focusing lens 72. The concave back surface 82b of the first boot lens 82 is typically joined or affixed to the convex front surface 72a of the bi-convex focusing lens 72 using optical cement or some other optically transparent bonding technique.

The second boot lens 84 has a concave front surface 84a for mating with a convex back surface 72b of the bi-convex focusing lens 72. The concave front surface 84a of the second boot lens 84 is typically joined or affixed to the convex back surface 72b of the bi-convex focusing lens 72 using optical cement or some other optically transparent bonding technique.

The second boot lens 84 also has a convex back surface 84b. As with the multiplexing devices 50 and 60, the reflective concave diffraction grating 16 can be formed using a separate material, and this material can then be joined or affixed to the convex back surface 84b of the second boot lens 84 using optical cement or some other optically transparent bonding technique. Alternatively, the reflective concave diffraction grating 16 can be formed directly on the convex back surface 84b of the second boot lens 84, thereby avoiding the joining or affixing of the reflective concave diffraction grating 16 to the convex back surface 84b of the second boot lens 84. In either case, the reflective concave diffraction grating 16 and the second boot lens 84 are integrated along with the bi-convex focusing lens 72 and the first boot lens 82 to form a compact, rigid, and environmentally and thermally stable multiplexing device 80. The integrated nature of this multiplexing device 80 is particularly useful for maintaining component alignment, which provides long-term performance in contrast to some non-integrated air-spaced devices that characteristically degrade in alignment and therefore performance over time.

The multiplexing device 80 is functionally identical to the multiplexing device 70, except for a slight decrease in optical beam transmission efficiency due to the addition of the first boot lens 82 and the second boot lens 84. However, even with this slight decrease in optical beam transmission efficiency, the optical performance of the multiplexing device 80 is still exceptional.

At this point it should be noted that either the first boot lens 82 or the second boot lens 84 may be removed from the multiplexing device 80, and/or the either the first boot lens 82 or the second boot lens 84 may be integrated with the bi-convex focusing lens 72 in the multiplexing device 80 so as to create additional alternate embodiments (not shown) which also obtain exceptional optical performance while using the reflective concave diffraction grating 16.

Referring to FIGS. 8a and 8b, there are shown a side view and a top view, respectively, of an alternate embodiment of a wavelength division multiplexing device 90 in accordance with the present invention. The multiplexing device 90 differs from the previously described embodiments by using an additional reflecting surface 92. The reflecting surface 92 may be fabricated of any suitable highly reflective material such as, for example, aluminum or gold. The reflecting surface 92 allows the multiplexing device 90 to be more compact by utilizing the space between the fiber coupling devices 14 and 18 and the reflective concave diffraction grating 16 in a more efficient manner. That is, the reflecting surface 92 receives the plurality of monochromatic optical input beams 22 from the corresponding plurality of optical input fibers 12 secured within the input fiber coupling device 14, and reflects the plurality of monochromatic optical input beams 22 toward the reflective concave diffraction grating 16. The reflecting surface 92 also receives the single multiplexed, polychromatic optical output beam 24 from the reflective concave diffraction grating 16, and reflects the single multiplexed, polychromatic optical output beam 24 toward the output fiber coupling device 18 where it becomes incident upon the single optical output fiber 20. The single multiplexed, polychromatic optical output beam 24 is then coupled into the single optical output fiber 20 for transmission therethrough. Of course, it is within the scope of the present invention to use even additional reflecting surfaces.

In accordance with the practices described above, focusing lenses may be added between the fiber coupling devices 14 and 18 and the reflecting surface 92, and/or between the reflecting surface 92 and the reflective concave diffraction grating 16. Also, boot lenses and/or prisms may be added to the multiplexing device 90 in accordance with the practices described above. The benefits and detriments associated with using these additional components are applicable to the multiplexing device 90 as would be the case with the embodiments described above.

Figure 9:
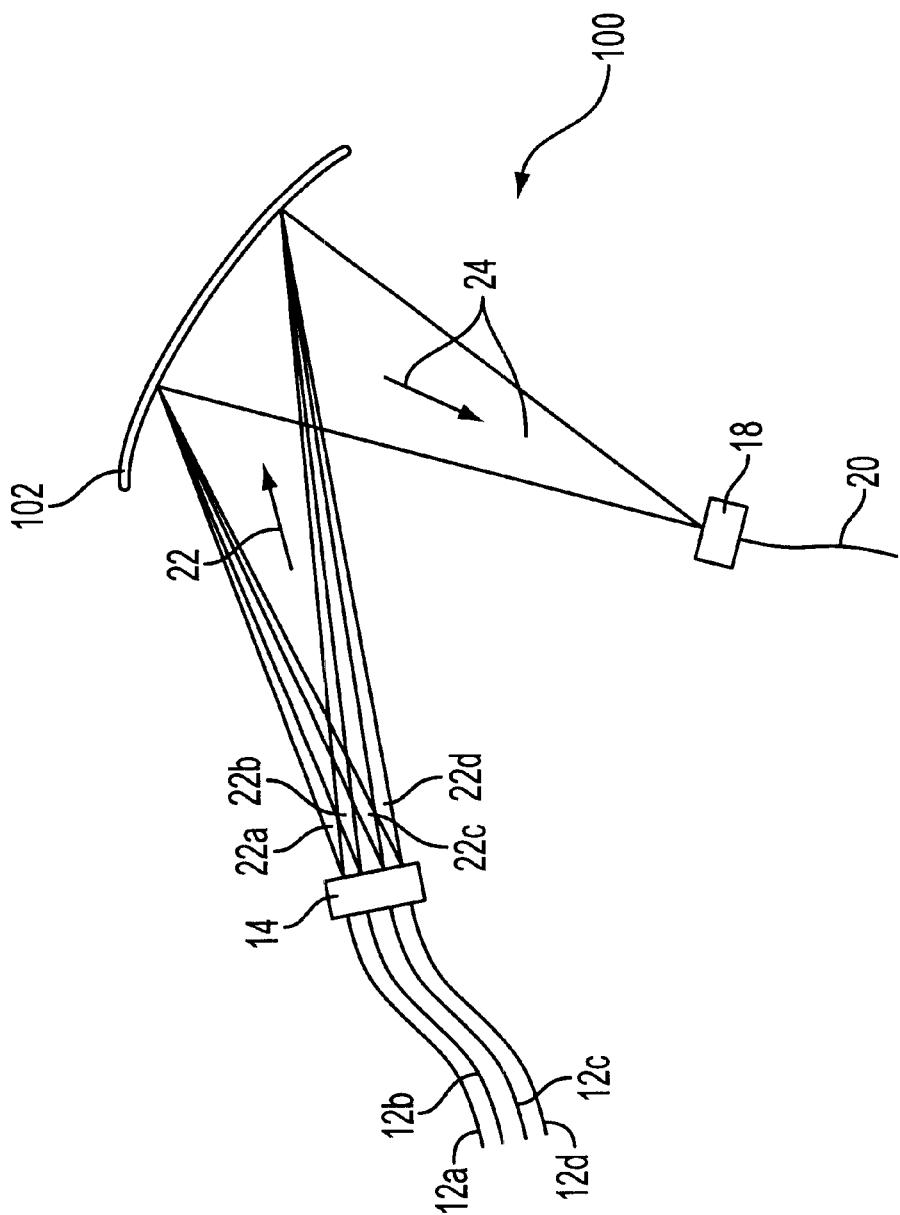
FIG. 9 is a side view of a wavelength division multiplexing device having a non-Littrow reflective concave diffraction grating in accordance with the present invention.

Referring to FIG. 9, there is shown a side view of an alternate embodiment of a wavelength division multiplexing device 100 in accordance with the present invention. The multiplexing device 100 differs from the previously described embodiments by using a reflective concave diffraction grating 102 that is configured to operate at reflecting angle that is different than the reflecting angle of the previously described embodiments. However, as with the previously described embodiments, the reflective concave diffraction grating 102 receives the plurality of monochromatic optical input beams 22 from the corresponding plurality of optical input fibers 12 secured within the input fiber coupling device 14, removes the angular separation from the plurality of monochromatic optical input beams 22, and reflects the single multiplexed, polychromatic optical output beam 24 toward the output fiber coupling device 18 where it becomes incident upon the single optical output fiber 20. The single multiplexed, polychromatic optical output beam 24 is then coupled into the single optical output fiber 20 for transmission therethrough.

In accordance with the practices described above, focusing lenses may be added between the input fiber coupling device 14 and the reflective concave diffraction grating 102, and/or between the reflective concave diffraction grating 102 and the output fiber coupling device 18. Also, boot lenses and/or prisms may be added to the multiplexing device 100 in accordance with the practices described above. The benefits and detriments associated with using these additional components are applicable to the multiplexing device 100 as would be the case with the embodiments described above.

Of course, the most significant benefits come from obtaining exceptional optical performance while using a reflective concave diffraction grating in a multiplexing/demultiplexing device. That is, all of the above-described embodiments obtain exceptional optical performance while using a reflective concave diffraction grating. The use of a reflective concave diffraction grating in a multiplexing/demultiplexing device also yields reduced device cost, complexity, and manufacturing risk. Simply said, the use of a reflective concave diffraction grating in a multiplexing/demultiplexing device allows for the construction of a family of simple, low cost, yet very powerful WDM devices, particularly for use in DWDM (i.e., high channel number) applications.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An improved wavelength division multiplexing device for multiplexing a plurality of monochromatic optical beams into a multiplexed, polychromatic optical beam, the improvement comprising:

a concave diffraction grating for combining a plurality of diverging monochromatic optical beams into a converging multiplexed, polychromatic optical beam;

wherein the plurality of diverging monochromatic optical beams travel along a first direction to the concave diffraction grating;

wherein the converging, multiplexed, polychromatic optical beam travels along a second direction from the concave diffraction grating;

wherein the second direction is substantially opposite the first direction; and wherein the concave diffraction grating is oriented at a Littrow diffraction angle with respect to the first and second directions.

2. The improved wavelength division multiplexing device as defined in claim 1, wherein the concave diffraction grating is a reflective concave diffraction grating.

3. The improved wavelength division multiplexing device as defined in claim 1, wherein the concave diffraction grating is formed in a polymer material and has a reflective surface.

4. The improved wavelength division multiplexing device as defined in claim 1, wherein the concave diffraction grating is etched into a rigid material and has a reflective surface.

5. An integrated wavelength division multiplexing device comprising:

a concave diffraction grating for combining a plurality of diverging monochromatic optical beams into a converging multiplexed, polychromatic optical beam; and at least one boot lens for transmitting the plurality of diverging monochromatic optical beams to the concave diffraction grating, and for transmitting the converging, multiplexed, polychromatic optical beam from the concave diffraction grating;

wherein the plurality of diverging monochromatic optical beams are transmitted by the at least one boot lens along a first direction to the concave diffraction grating;

wherein the converging, multiplexed, polychromatic optical beam is transmitted by the at least one boot lens along a second direction from the concave diffraction grating;

wherein the second direction is substantially opposite the first direction; and wherein the concave diffraction grating is oriented at a Littrow diffraction angle with respect to the first and second directions.

6. The integrated wavelength division multiplexing device as defined in claim 5, wherein the concave diffraction grating is a reflective concave diffraction grating.

7. The integrated wavelength division multiplexing device as defined in claim 5, wherein a first of the at least one boot lens has a convex interface surface, wherein the concave diffraction grating is formed at the convex interface surface of the first of the at least one boot lens.

8. The improved wavelength division multiplexing device as defined in claim 7, wherein the concave diffraction grating is formed in a polymer material, has a reflective surface, and is affixed to the convex interface surface of the first of the at least one boot lens.

9. The improved wavelength division multiplexing device as defined in claim 7, wherein the concave diffraction grating is etched into a rigid material, has a reflective surface, and is affixed to the convex interface surface of the first of the at least one boot lens.

10. The improved wavelength division multiplexing device as defined in claim 7, wherein the concave diffraction grating has a reflective surface and is formed in the convex interface surface of the first of the at least one boot lens.

11. The integrated wavelength division multiplexing device as defined in claim 5, further comprising:

at least one focusing lens affixed to the at least one boot lens for aiding in the transmission of the plurality of diverging monochromatic optical beams to the concave diffraction grating, and for aiding in the transmission of the converging, multiplexed, polychromatic optical beam from the concave diffraction grating.

12. The integrated wavelength division multiplexing device as defined in claim 5, further comprising:

at least one reflecting surface affixed to the at least one boot lens for reflecting the plurality of diverging monochromatic optical beams being transmitted to the concave diffraction grating, and for reflecting the converging, multiplexed, polychromatic optical beam being transmitted from the concave diffraction grating.

13. The integrated wavelength division multiplexing device as defined in claim 5, further comprising:

at least one prism affixed to the at least one boot lens for aiding in the transmission of the plurality of diverging monochromatic optical beams to the concave diffraction grating, and for aiding in the transmission of the converging, multiplexed, polychromatic optical beam from the concave diffraction grating.

14. The integrated wavelength division multiplexing device as defined in claim 12, further comprising:

at least one reflecting surface affixed to the at least one prism for reflecting the plurality of diverging monochromatic optical beams being transmitted to the concave diffraction grating, and for reflecting the converging, multiplexed, polychromatic optical beam being transmitted from the concave diffraction grating.

15. An improved wavelength division demultiplexing device for demultiplexing a multiplexed, polychromatic optical beam into a plurality of monochromatic optical beams, the improvement comprising:

a concave diffraction grating for separating a diverging, multiplexed, polychromatic optical beam into a plurality of converging monochromatic optical beams;

wherein the diverging, multiplexed, polychromatic optical beam travels along a first direction to the concave diffraction grating;

wherein the plurality of converging monochromatic optical beams travel along a second direction from the concave diffraction grating;

wherein the second direction is substantially opposite the first direction; and wherein the concave diffraction grating is oriented at a Littrow diffraction angle with respect to the first and second directions.

16. The improved wavelength division demultiplexing device as defined in claim 15, wherein the concave diffractiongrating is a reflective concave diffraction grating.

17. The improved wavelength division demultiplexing device as defined in claim 15, wherein the concave diffraction grating is formed in a polymer material and has a reflective surface.

18. The improved wavelength division demultiplexing device as defined in claim 15, wherein the concave diffraction grating is etched into a rigid material and has a reflective surface.

19. An integrated wavelength division demultiplexing device comprising:

a concave diffraction grating for separating a diverging, multiplexed, polychromatic optical beam into a plurality of converging monochromatic optical beams; and at least one boot lens for transmitting the diverging, multiplexed, polychromatic optical beam to the concave diffraction grating, and for transmitting the plurality of converging monochromatic optical beams from the concave diffraction grating;

wherein the diverging, multiplexed, polychromatic optical beam is transmitted by the at least one boot lens along a first direction to the concave diffraction grating;

wherein the plurality of converging monochromatic optical beams are transmitted by the at least one boot lens along a second direction from the concave diffraction grating;

wherein the second direction is substantially opposite the first direction; and wherein the concave diffraction grating is oriented at a Littrow diffraction angle with respect to the first and second directions.

20. The integrated wavelength division demultiplexing device as defined in claim 19, wherein the concave diffraction grating is a reflective concave diffraction grating.

21. The integrated wavelength division demultiplexing device as defined in claim 19, wherein a first of the at least one boot lens has a convex interface surface, wherein the concave diffraction grating is formed at the convex interface surface of the first of the at least one boot lens.

22. The improved wavelength division demultiplexing device as defined in claim 21, wherein the concave diffraction grating is formed in a polymer material, has a reflective surface, and is affixed to the convex interface surface of the first of the at least one boot lens.

23. The improved wavelength division demultiplexing device as defined in claim 21, wherein the concave diffraction grating is etched into a rigid material, has a reflective surface, and is affixed to the convex interface surface of the first of the at least one boot lens.

24. The improved wavelength division demultiplexing device as defined in claim 21, wherein the concave diffraction grating has a reflective surface and is formed in the convex interface surface of the first of the at least one boot lens.

25. The integrated wavelength division demultiplexing device as defined in claim 19, further comprising:

at least one focusing lens affixed to the at least one boot lens for aiding in the transmission of the diverging, multiplexed, polychromatic optical beam to the concave diffraction grating, and for aiding in the transmission of the plurality of converging monochromatic optical beams from the concave diffraction grating.

26. The integrated wavelength division demultiplexing device as defined in claim 19, further comprising:

at least one reflecting surface affixed to the at least one boot lens for reflecting the diverging, multiplexed, polychromatic optical beam being transmitted to the concave diffraction grating, and for reflecting the plurality of converging monochromatic optical beams being transmitted from the concave diffraction grating.

27. The integrated wavelength division demultiplexing device as defined in claim 19, further comprising:

at least one prism affixed to the at least one boot lens for aiding in the transmission of the diverging, multiplexed, polychromatic optical beam to the concave diffraction grating, and for aiding in the transmission of the plurality of converging monochromatic optical beams from the concave diffraction grating.

28. The integrated wavelength division demultiplexing device as defined in claim 27, further comprising:

at least one reflecting surface affixed to the at least one prism for reflecting the diverging, multiplexed, polychromatic optical beam being transmitted to the concave diffraction grating, and for reflecting the plurality of converging monochromatic optical beams being transmitted from the concave diffraction grating.

* * * * *